United States Patent
Petrescu et al.

(10) Patent No.: US 7,301,923 B2
(45) Date of Patent: Nov. 27, 2007

(54) METHOD AND APPARATUS FOR FACILITATING HANDOFFS IN A WIRELESS COMMUNICATION NETWORK

(75) Inventors: Alexandru Petrescu, Essonne (FR); Christophe Janneteau, Bois d'Arcy (FR); Vidya Narayanan, Schaumburg, IL (US)

(73) Assignee: Motorola, Inc., Schaumburg, IL (US)

( * ) Notice: Subject to any disclaimer, the term of this patent is extended or adjusted under 35 U.S.C. 154(b) by 147 days.

(21) Appl. No.: 11/245,847

(22) Filed: Oct. 7, 2005

(65) Prior Publication Data

US 2007/0081494 A1    Apr. 12, 2007

(51) Int. Cl.
*H04Q 7/20* (2006.01)

(52) U.S. Cl. .............. 370/331; 370/332; 370/338; 370/329; 370/328; 370/348; 455/436; 455/437; 455/438; 455/426.1; 455/426.2; 455/439; 455/422.1

(58) Field of Classification Search .......... 370/331, 370/332, 338, 329, 328, 348; 455/436, 437, 455/438, 439, 440, 441, 442, 444, 445, 422.1, 455/426.1, 426.2, 403, 500, 517, 466, 414.1, 455/414.2, 414.3
See application file for complete search history.

(56) References Cited

U.S. PATENT DOCUMENTS

| | | | |
|---|---|---|---|
| 6,909,899 B2 * | 6/2005 | Wang et al. ............. | 455/436 |
| 2003/0125027 A1 * | 7/2003 | Gwon et al. ............. | 455/436 |
| 2005/0018637 A1 * | 1/2005 | Karoubalis et al. ...... | 370/338 |
| 2006/0120287 A1 * | 6/2006 | Foti et al. ............... | 370/231 |
| 2007/0002833 A1 * | 1/2007 | Bajic ...................... | 370/352 |

* cited by examiner

*Primary Examiner*—Keith Ferguson
(74) *Attorney, Agent, or Firm*—Randi L. Karpinia (57) ABSTRACT

A method and apparatus for facilitating handoff for a mobile entity in a wireless communication network is provided (100). The method comprising obtaining a first internet protocol (IP) address for the mobile entity (105) when the mobile entity is attached to a first access node, identifying at least one target access node (110), the target access node being a potential access node for handoff for the mobile entity, sending a trigger message corresponding to the mobile entity to the identified target access node (115) and acquiring a second IP addresses for the mobile entity at the target access node (120). The invention also proposes a method for creating a tunnel for facilitating the handoff for a mobile entity from the first access node to the target access node (205, 210, 215, 220).

20 Claims, 7 Drawing Sheets

METHOD AND APPARATUS FOR FACILITATING HANDOFFS IN A WIRELESS COMMUNICATION NETWORK

FIELD OF THE INVENTION

The present invention relates in general to wireless communications and specifically to facilitating handoffs of mobile entities in a wireless communication network.

BACKGROUND

Advances in wireless communication technology have given rise to a number of wireless applications such as pagers, cellular phones, and mobile computing and networking applications. One of the applications, namely mobile computing and networking, allows a mobile device capable of connecting wirelessly to a network to freely move while remaining wirelessly connected to the network. As the mobile device moves between different networks and sub networks (referred to herein as a sub-net), the connection to a first network or sub-net is dropped, as needed, and a connection to a target network or sub-net is established (also termed a handoff). Such a handoff is made possible through an extension of the Internet Protocol (IP) referred to as Mobile IP. In general, Mobile IP creates the perception that the mobile device is always attached to the same network or subnet even as it is moving around. Specifically, Mobile IP allows the mobile device to retain the same network or IP address regardless of the particular network or sub-net to which the mobile device is actually connected. Thus, a remote application can send data packets to the mobile device at the same IP address no matter how many handoffs (i.e., changes in network or subnet connections) may have occurred.

Although Mobile IP allows the mobile device to freely move between different networks and subnets while appearing to maintain the same network connection, the transition is not always a seamless one. For example, when a handoff occurs in the middle of an ongoing data transfer session, some data packets may be sent to a first care-of address before registration of the target care-of address can be completed. As a result, these data packets may become lost, thereby disrupting the flow of data packets to the mobile device. Depending on the duration of the disruption, the data transfer session may be greatly affected. For example, where the network is particularly slow or congested, a large number of data packets may be lost during the handoff, possibly causing an application running on the mobile device to terminate or otherwise fail.

To allow a mobile device to move between different networks and subnets while appearing to maintain the same network connection, a number of techniques are known. One is the use of local link-layer triggers to enhance link-layer messaging. Another is to use a protocol design that considers address auto configuration. Yet another is to use tunneling between a first access node and a second access node while not taking into account address auto configuration. Yet another is to consider link-layer events on a same machine to trigger network-layer events. Further yet is to pre-configure a Care-of-address (CoA) only at a target access node, use tunnels between the target and first access nodes, and duplicate packets by the Home Agent such as to send a packet to each access node (first and target). Yet another is to address fast re-authentication exclusively without tackling address auto configuration. Each of these known techniques has drawbacks, such as one may tackle address auto configuration but will generate large amounts of traffic during each handoff. Another may not generate large amounts of traffic but will not tackle address auto configuration. In any case, each known technique has shortcomings.

Hence, there exists a need for facilitating handoffs for a mobile entity in a wireless communication network while addressing the shortcomings of the prior art.

BRIEF DESCRIPTION OF THE FIGURES

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION OF THE DRAWINGS

Before describing in detail embodiments that are in accordance with the present invention, it should be observed that the embodiments reside primarily in combinations of method steps and apparatus components related to providing a fast handoff of mobile entities between wireless communication networks. Accordingly, the apparatus components and method steps have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

It will be appreciated that embodiments of the invention described herein may be comprised of one or more conventional processors and unique stored program instructions that control the one or more processors to implement, in conjunction with certain non-processor circuits, some, most, or all of the functions of method and apparatus for providing a fast handoff of mobile entities between wireless communication networks described herein. The non-processor circuits may include, but are not limited to, a radio receiver, a radio transmitter, signal drivers, clock circuits, power source circuits, and user input devices. As such, these functions may be interpreted as steps of a method to perform a fast handoff of mobile entities between wireless communication networks. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

An embodiment of the present invention provides enhancements to a link-layer attachment and Dynamic Host Configuration Protocol (DHCP) procedure during handoffs in a wireless communication network. According to one embodiment, one enhancement includes pre-allocating an Internet Protocol (IP) address for a given Media Access Control (MAC) address of a mobile entity at an access node, during attachment or power-up of the mobile entity. In such an embodiment, pre-configuring an IP address at an access node speeds up the handoff time. According to another embodiment, a second enhancement includes using IP configuration parameters to create a tunnel between an access node the mobile entity was previously attached to and a new access node that the mobile entity is attached to for transferring data corresponding to the mobile entity arriving at the new access node during handover.

Figure 1:
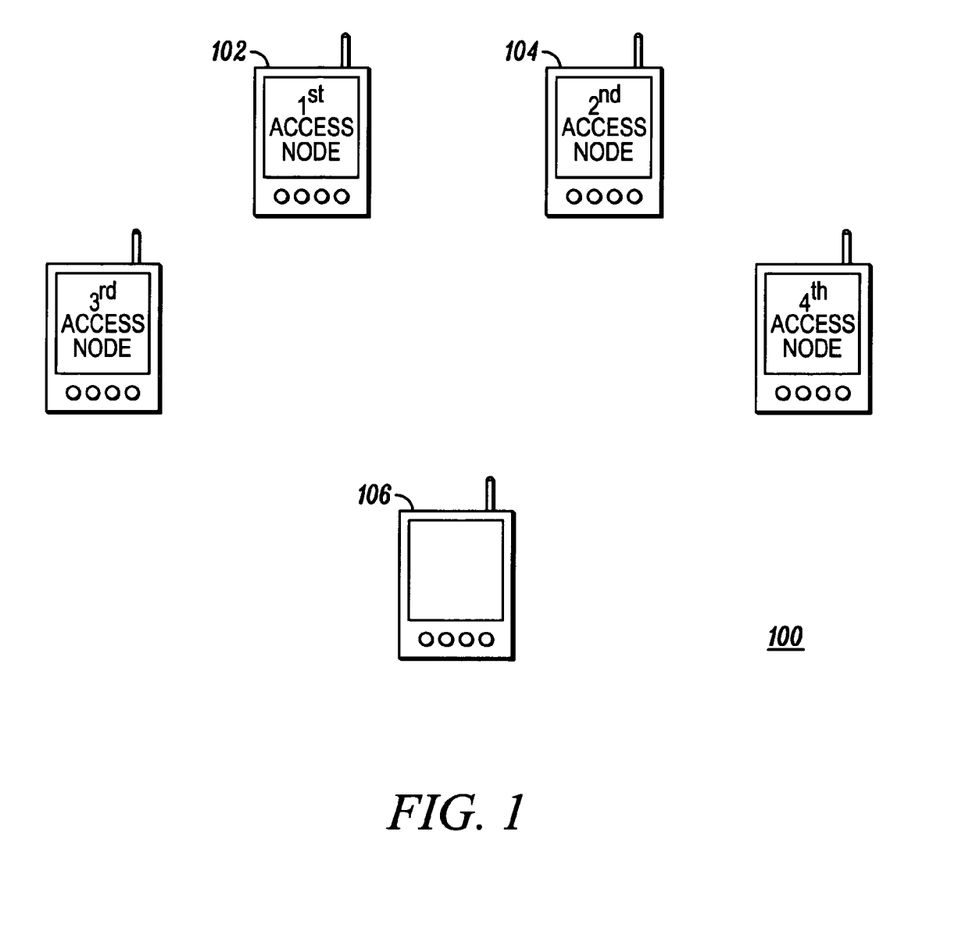
FIG. 1 is a block diagram illustrating a wireless communication network in accordance with some embodiments of the invention.

Some of the advantages of embodiments of the present invention include reducing the handoff time between IP subnets by using a "proxy" DHCP on access nodes to obtain a set of IP addresses for a given mobile entity's MAC address. One example would be to obtain IP addresses for the mobile entity in all the access nodes in a domain when the mobile entity enters the domain. Another advantage is, in one embodiment, preemptively creating a tunnel between the first-access node and the target-access node to forward data packets between two access nodes where the handoff occurs. To further expedite the handoff process, the request message and response messages are link-layer messages that carry network-layer information Turning now to FIG. 1, shown is a wireless communication network 100 in accordance with an embodiment of the present invention. The wireless communication network 100 comprises a first access node 102, a second access node (also referred to as a target access node) 104, and a mobile entity 106. While the mobile entity 106 moves in the wireless communication network 100, the mobile entity 106 may move out of range of the first access node 102 and move into range of the second access node 104. Once the mobile entity 106 is in range of the second access node 104, the first access node 102 performs a handoff procedure with the second access node 104 to facilitate seamless mobility of the mobile entity 106. As shown in FIG. 1, other access nodes to which the mobile entity 106 is not attached, e.g. for a predetermined time, and which the mobile entity 106 is within coverage are called potential target access nodes.

Those skilled in the art shall appreciate that FIG. 1 illustrates wireless elements of a wireless communication network 100, but that there may also exist wired elements. For example, the wireless communication network 100 may include a wired access node (not shown), where the mobile entity 106 may be attached via a wired connection to the wired access node. In such a case, the mobile entity 106 may detach from the wired access node (not shown) and may move into range of the first access node 102. Further, the mobile entity 106 may move from the range of the first access node 102 and become attached to the wired access node (not shown). In either case, the access nodes (whether wireless or wired) perform a handoff procedure to facilitate seamless mobility of the mobile entity 106. In any case, an embodiment of the present invention is contemplated to encompass wired elements.

Those skilled in the art shall appreciate that four access nodes are shown for ease of explanation and the embodiment of the invention should in no way be restricted to four access nodes. Several access nodes can be added and can be used to facilitate handoff of the mobile entity in the wireless communication network.

In one embodiment, the first access node 102 and the target access node 104 may differ in a number of characteristics. One example, the first access node 102 may be on one subnet and the target access node 104 may be based on a second subnet. A second example, the first access node 102 may be heavily loaded and the target access node 104 may be lightly loaded. A third example, the number of mobile entities attached to the first access node 102 may be less than the number of entities attached to the target access node 104. In any case, the first access node 102 is in communication with the target access node 104. In one embodiment, the first access node 102 and the target access node 104 are in the same domain.

Figure 2:
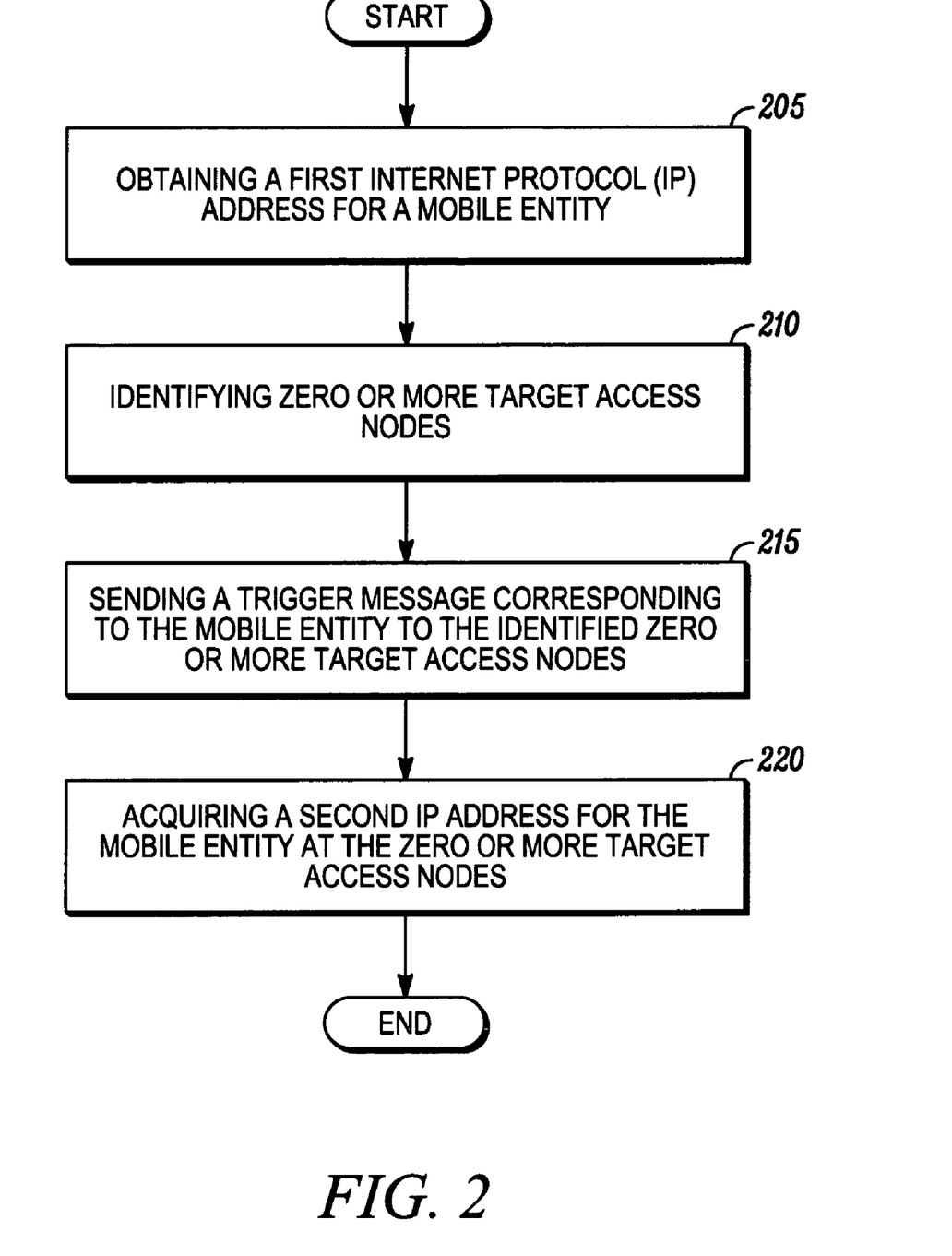
FIG. 2 is a flow diagram showing a method for facilitating handoff of a mobile entity in accordance with some embodiments of the invention.

In operation, a method for facilitating handoff of a mobile entity in a wireless communication network is shown in FIG. 2. Initially, the method comprises obtaining a first internet protocol (IP) address for the mobile entity when the mobile entity is attached to a first access node (step 205). For instance, when a mobile entity initially powers up in a wireless communication network and attaches to an access node, for example a first access node 102, the mobile entity sends a request message to the first access node requesting registration. During the initial attachment of the mobile entity with the first access node, the first access node requests an IP address (namely the first IP address) that is unique to the mobile entity.

In one embodiment, registration comprises the first access node acting as a Dynamic Host Configuration Protocol (DHCP) proxy for the mobile entity and acquiring the first IP address for the mobile entity by contacting a DHCP server. The first access node responds to the registration request with a response where the response includes the first IP address. Subsequently, the first IP address is used by the mobile entity during communications with the first access node. Further, the response may comprise additional information such as a default router and a subnet mask. Further yet, in one embodiment, the response may comprise a mobile entity identifier. Further yet, in one embodiment, the response is a Layer 2 (L2) or link-layer message containing network-layer information, e.g. the first IP address.

In one embodiment, the first IP address corresponds to the mobile entity's Media Access Control (MAC) address. In other embodiments, the first IP address may correspond to a Network Access Identifier (NAI) of the mobile entity. In any case, the first IP address corresponds to an identifier that uniquely identifies the mobile entity in the wireless communication network.

Continuing with FIG. 2, the first access node identifies zero or more target access nodes which could serve as potential target access nodes for handoff for the mobile entity (step 210). Those skilled in the art may appreciate that the first access node (the access node to which the mobile entity is currently attached) can identify the zero or more target access nodes simultaneously while fulfilling the registration request of the mobile entity. Further, those skilled in the art may appreciate that there maybe situations when no target nodes may exist for potential handoff of the mobile entity. In such a situation, the mobile entity can be informed of the situation and is not able to handoff to another access node.

In one embodiment, the first access node can use a neighbor map to identify the target access node. The neighbor map is maintained at the each access node and comprises subnet information corresponding to access nodes within the wireless communication network. In another embodiment, when the mobile entity detects an impending handoff (or when it learns of a neighboring access node which is a potential target for handoff), the mobile entity may send a trigger message to the first access node (the access node to which the mobile entity is currently attached), requesting a the first access node to send a trigger message to the target access node. The trigger message may inform the target access node to acquire an IP address corresponding to the mobile entity and facilitate handoff with the target access node. Since the mobile entity itself detects the target access node, the access nodes may not require maintaining a neighbor map.

Continuing with FIG. 2, if a target access node has been identified, the first access node sends a trigger message corresponding to the mobile entity to the identified zero or more target access nodes (step 215) and requests the zero or more target access nodes acquire second IP addresses for the mobile entity (step 220). In one embodiment, the trigger message can be one of a dynamic host configuration protocol (DHCP) message, a Fast Mobile Internet Protocol (FMIP) message, and an IEEE 802.11a/b/g message, where such messages are generally known in the art. Alternative embodiments may utilize multicast distribution and/or Simple Network Management Protocol (SNMP) to send the trigger message to each access node in the wireless communication network, e.g. when the mobile entity powers up. In any case, the trigger message sent from the first access node to the target access node comprises a first IP address which corresponds to an identifier that uniquely identifies the mobile entity in the wireless communication network, e.g. the mobile entity's MAC address.

In any case, the target access node acquires a second IP address for the mobile entity (step 120). As with the first IP address, the second IP address is unique to the mobile entity. In one embodiment, the second IP address corresponds to the mobile entity's Media Access Control (MAC) address. In other embodiments, the second IP address may correspond to a Network Access Identifier (NAI) of the mobile entity. In any case, the second IP address corresponds to an identifier that uniquely identifies the mobile entity in the wireless communication network. Further, if the first and second access nodes are on the same subnet, the first and second IP addresses of the mobile entity can be the same. As is known to one of ordinary skill in the art, the mobile entity can generally detect whether the target access node is on the same subnet as the first access node by monitoring information in enhanced link-layer beacon messages. However, if on the other hand the first and second access nodes are on different subnets, the first and second IP addresses obtained for the mobile entity are generally different.

Figure 3:
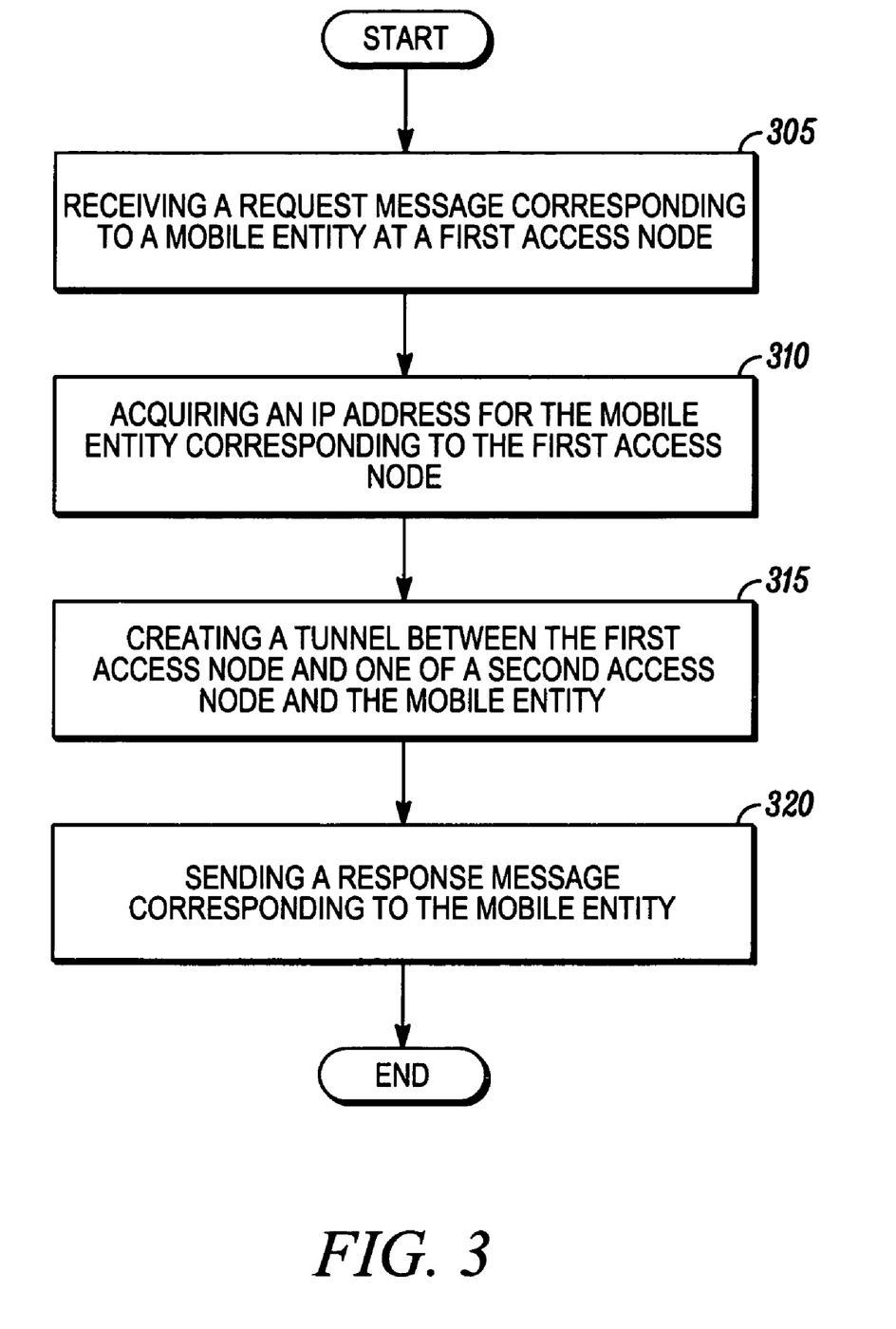
FIG. 3 is a flow diagram showing a method for facilitating handoff of a mobile entity in a wireless communication network from the perspective of a first access node in accordance with some embodiments of the invention.

Referring to FIG. 3, a method for facilitating handoff of a mobile entity in a wireless communication network from the perspective of a first access node is shown. The method comprises receiving a request message corresponding to the mobile entity at a first access node (step 305). The first access node obtains a first IP address corresponding to the mobile entity in response to the request message, if an IP was not already acquired (step 310). For example, if the mobile entity had initially powered up under a different access node, for instance a third access node, the third access node may have sent a trigger message to its neighboring access nodes, where the first access node is a neighbor, and the first access node acquired an IP address for the mobile entity in anticipation of a future handoff to the first access node. In such a case, the first access node has already acquired an IP address for the mobile entity.

As mentioned previously, the step of acquiring a first IP address (step 310) and the step of sending a trigger message to zero or more target access nodes can be performed simultaneously (step 215). Thus, when the mobile entity moves from the first access node to the second access node, the second IP address acquired by the second access node for the mobile entity is already available at the second access node. The second access node does not need to contact the DHCP server again to obtain an IP address (namely the second IP address) corresponding to the mobile entity. Performing these two steps simultaneously substantially increases the efficiency of the handover process.

Continuing with FIG. 3, once the first IP address and the second IP address are acquired, a tunnel is created between the first access node and either the second access node or the mobile entity (step 315). In one embodiment, the second access node sends a tunnel request message to the first access node, wherein the tunnel request message contains the first IP address for the mobile entity. The first access node and the target access node build a unidirectional tunnel connecting the first access node to the second access node upon exchanging tunnel request and response messages. Those skilled in the art shall appreciate that the tunnel can be built directly to the mobile entity as well. As such, in a second embodiment, the tunnel is created between the first access node and the mobile entity. In any case, pending data packets at the first access node are sent to the second access node using the tunnel.

Continuing with FIG. 3, once a tunnel is created, the second access node sends configuration parameters to the mobile entity using a response message (step 320). In one embodiment, the configuration parameters comprise a second IP address of the mobile entity. In another embodiment, the response message also contains the subnet mask and default router. In yet another embodiment, the configuration parameters comprise a mobile entity identifier. As mentioned above, the first IP address and the second IP address may be the same, e.g. if the subnet corresponding to the first IP address is the same as the subnet corresponding to the second IP address.

During handoffs within the same domain and across different IP subnets the DHCP addressing information is readily available at the access nodes. Having DHCP addressing information readily available reduces the handoff time considerably. In one embodiment, the handoffs use request and response messages termed a Layer-2 Information Message (LIM message). In any case, the response message is sent from the second access node to the mobile entity after successful Layer 2 association, where successful Layer 2 association occurs after successful tunnel creation. If the Layer 2 association fails, a negative response message can be sent to the mobile entity and the tunnel creation can be destroyed. In an exemplary embodiment of the invention, the tunnel can be created only after the association request has been fulfilled to avoid the overheads involved in the case the association fails.

Figure 4:
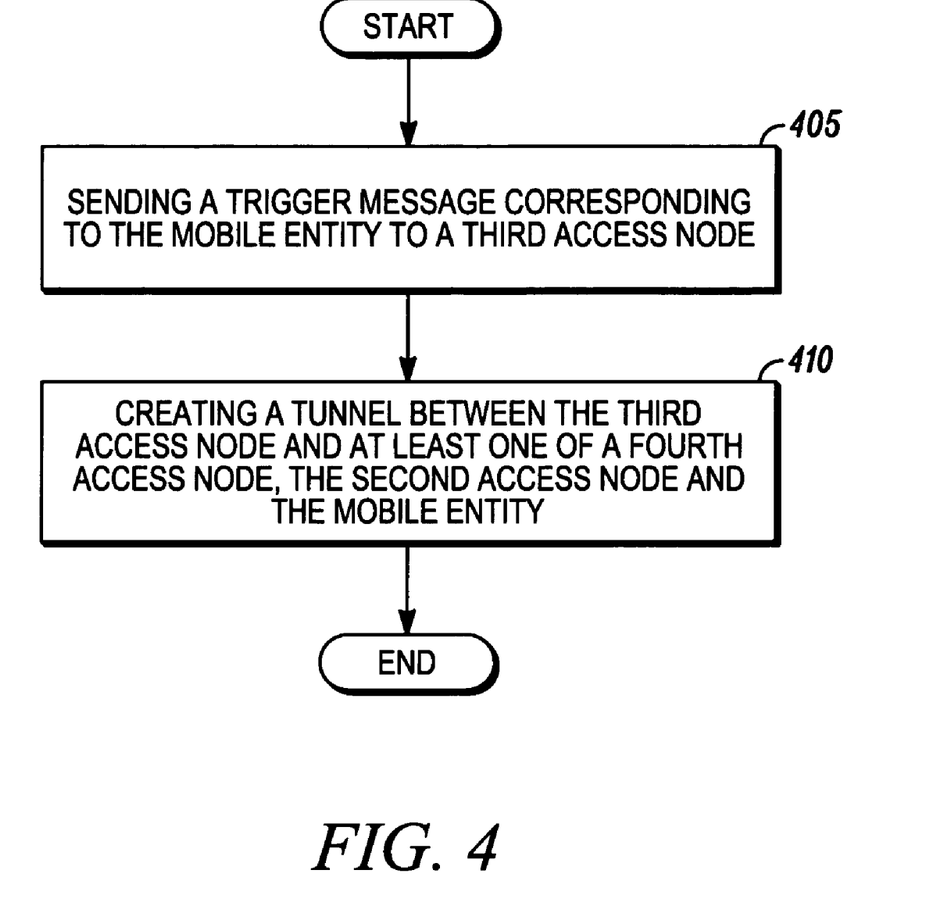
FIG. 4 is a flow diagram showing further steps for facilitating handoff of a mobile entity in accordance with some embodiments of the invention.

Referring to FIG. 4, further steps in a method for facilitating handoff of a mobile entity in a wireless communication network 100 are shown. When a mobile entity moves from a first access node to a second access node and completes the handoff procedure disclosed using FIG. 3, the first access node can also send messages to third and fourth access nodes within the wireless communication network 100 (step 405). The third access node is a neighbor of the first access node and not a neighbor of the second access node and the fourth access node can be a potential node for handoff of the mobile entity from the second access node. Hence, the first access node sends a trigger message corresponding to the mobile entity to both the third and fourth access nodes and triggers the creation of a tunnel between the third access node and at least one of a fourth access node, the second access node and the mobile entity in response to the trigger message (step 410). Further, the fourth access node can be the second access node itself when the tunnel can be created between the third access node and the second access node to which the mobile entity is currently attached. In another embodiment, the fourth access node can also be the mobile entity itself, where the third access node creates the tunnel with the mobile entity to enable handoff. The pre-configuration of IP addresses, as well as creation of secure tunnels substantially expedites the handoff process for the mobile entity.

Figure 5:
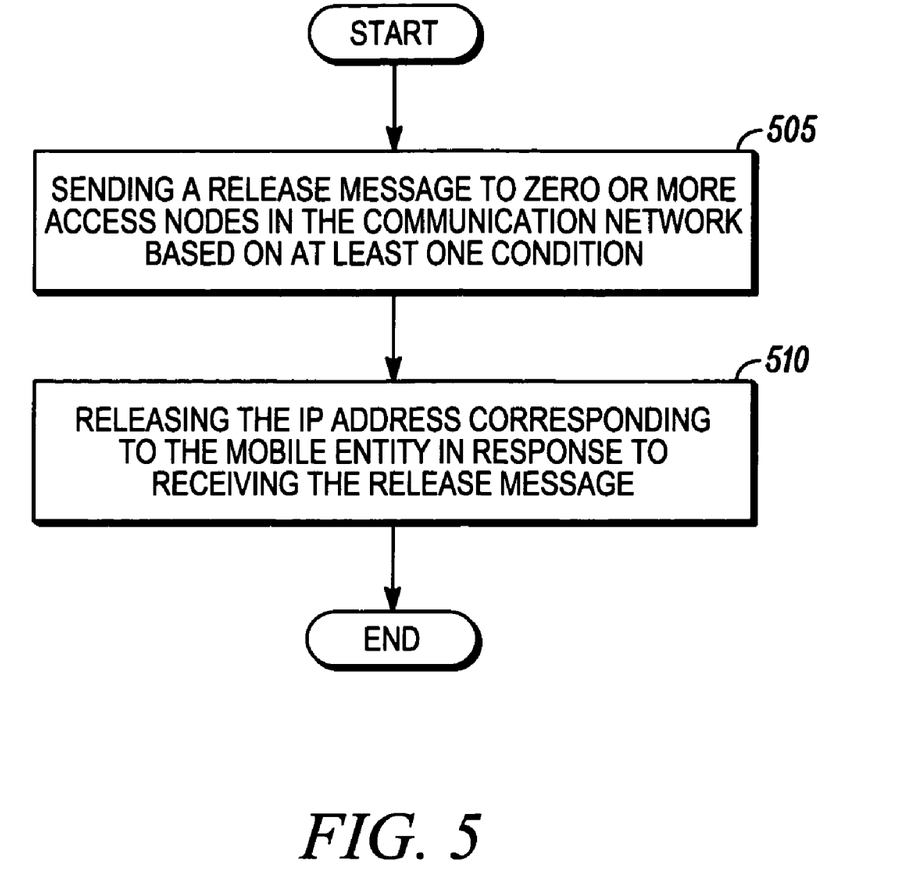
FIG. 5 is a flow diagram showing further steps for facilitating handoff of a mobile entity in accordance with some embodiments of the invention.

Referring to FIG. 5, further steps in a method for facilitating handoff of a mobile entity in a wireless communication network 100 are shown. The further steps include releasing IP addresses acquired by the access nodes in the wireless communication network. An access node sends a release message to zero or more target access nodes to release the IP addresses acquired based on receiving trigger messages (step 505). The release message can be sent based on a predetermined condition. For example, the predetermined condition can be one of an elapsed time period, a transfer of pending data from the second access node to the first access node, the mobile entity detaching from a network domain, the mobile entity handing off to a different access node and/or a forced release.

For instance, if the mobile entity has associated with a second access node after handoff from the first access node, the second access node can send a DHCP release message to other access nodes after Layer 3 (L3) tunnel establishment with the first access node. The release message can also be sent to the first access node after all the data pending at the first access node corresponding to the mobile entity has been transferred. In another embodiment, the release message can also be sent by the first access node to a third access node where as described above, the first access node sends a trigger message to the third access node (step 405) because the third access node is a potential node for handoff.

The release of acquired IP addresses can be helpful for a communication system with a low memory or a communication system having memory constraints. In one embodiment, the release of an IP addresses can be done using a DHCP release message. However, the release message is sent after a predetermined time interval. This predetermined interval is provided in order to prevent the conditions where the first access node receives a new DHCP Procure trigger message for the same mobile entity from a different target access node within the predetermined time interval. On receiving the release message, the zero or more access nodes release the IP address corresponding to the mobile entity (step 510). As mentioned, releasing IP addresses means to make available those IP addresses for other applications so as to clear memory constraints in the mobile entity.

Figure 6:
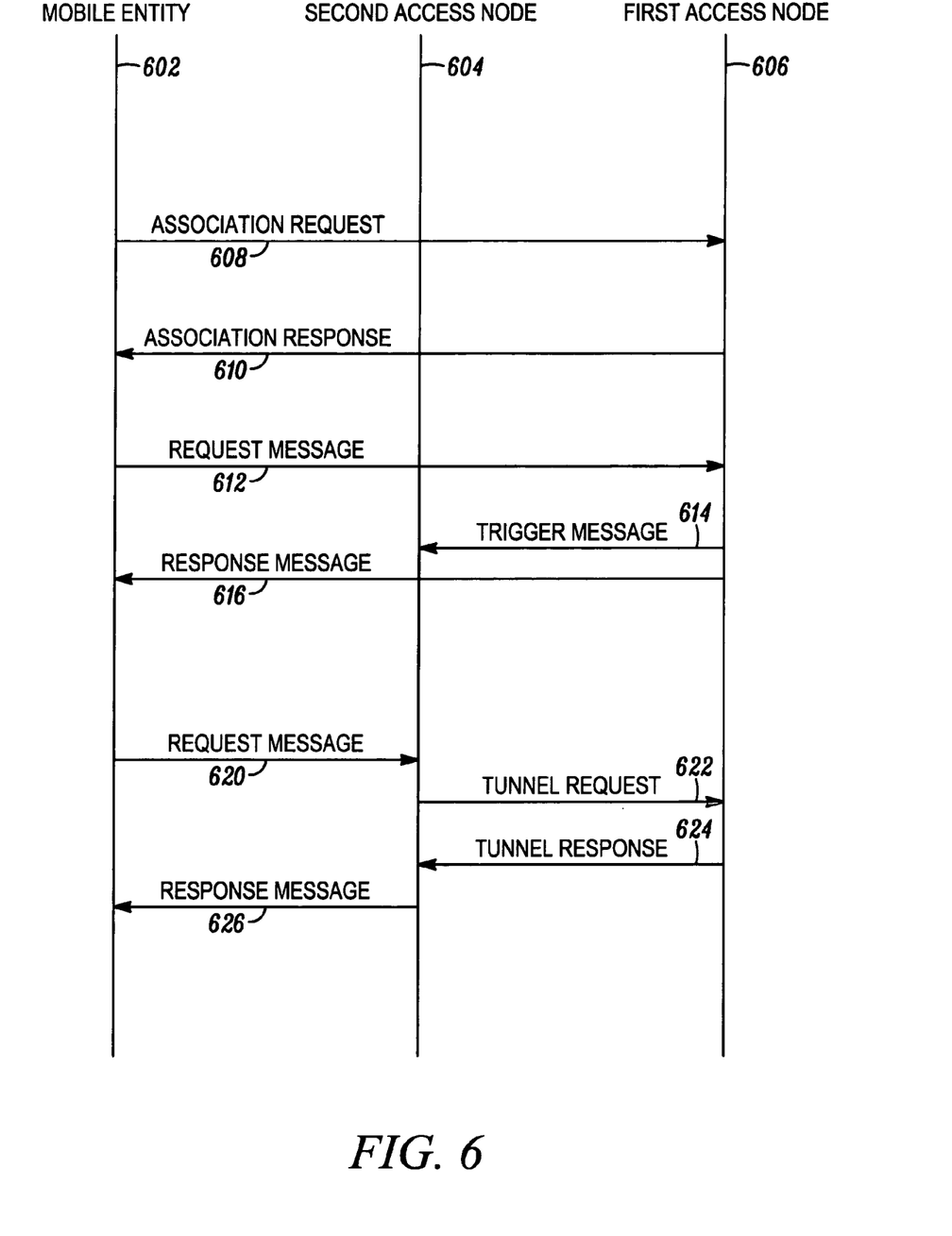
FIG. 6 is a message sequence chart for facilitating handoff of a mobile entity in accordance with an embodiment of the invention.

FIG. 6 is a message sequence chart depicting a method for facilitating handoff of a mobile entity in a wireless communication network in accordance with some embodiments of the invention. Those skilled in the art shall appreciate that two access nodes 604, 606 are shown for ease of explanation and the embodiment of the invention should in no way be restricted to two access nodes. Several access nodes can be added and can be used to facilitate handoff of the mobile entity in the wireless communication network. Communications 608, 610, 612, 614, 616 illustrate the behavior of the mobile node and first access node 606 during initial attachment while communications 620, 622, 624, 626 illustrate the subsequent attachment to the second access node 604 and handoff from the first access node 606 to the second access node 604.

A mobile entity 602 initially attaches to a first access node 606 and subsequently attaches to other target access nodes, for example a second access node 604. The second access node 604 and the first access node 606 are a part of a wireless communication network 600 but may belong to different subnets. In one embodiment, a DHCP server is connected with all access nodes including the first access node 606 and second access nodes 604 in the wireless communication network 100. In general, each access node 604, 606 determines which access nodes to send a trigger message to acquire an IP address for the mobile entity based on information stored in a neighbor graph residing on the access node. The neighbor graph comprises subnet information associated with each the access node, for example the first access node 606 and the second access node 604 so that the access node is able to determine whether it deals with a network-layer or link-layer handoff.

As illustrated in FIG. 6, during initial attachment of the mobile entity 602 under the first access node 606, the mobile entity 602 sends an association request 608 to the first access node 606. The first access node 606 then sends an association response 610 to the mobile entity 602. Upon receiving the association response 610 the mobile entity 602 sends a request message 612 requesting a first IP address for mobile entity's 602 MAC address. The first access node 606 in response to the request message 612 can send a message to the DHCP server requesting a first IP address for the mobile entity's 602 MAC address. During this process the first access node 606 acts as the proxy DHCP server for the mobile entity to retrieve the first IP address. Pursuant to one embodiment, the first access node 606 can simultaneously send a trigger message 614 to neighboring access nodes, for instance the second access node as shown in FIG. 6. The neighboring access nodes acquire a second IP address corresponding to the mobile entity's 602 MAC address. The trigger message 614 sent from the first access node 606 to the second access node 604 comprises the first IP address of the mobile entity 602 valid at the first access node 606. The second access node 604 in response to the trigger message 608 from the first access node 606 sends a DHCP trigger message to the DHCP server requesting a second IP address for the mobile entity 602. The DHCP server sends the second IP address for the mobile entity 602 to the second access node 604. The second IP address obtained by the second access node 604 is valid in the second access node's subnet. During handoffs within the same domain and across different IP subnets, the acquired IP addresses being readily available at the access nodes reduce the handoff time considerably. The first access node sends configuration data comprising the first IP address, the subnet mask and default router address to the mobile entity 602 over a wireless link. The configuration data is stored in the response message 616, which is a link-layer message containing network-layer information, and sent by the first access node 606 to the mobile entity 602.

When the mobile entity 602 roams and attaches to a target access node, for instance the second access node 604, it sends a re-association request to the second access node 604 requesting the second access node 604 to allow the re-association. The mobile entity 602 also sends a request message 620 to the second access node 604. The request message 620 triggers a tunnel being set up between the second access node 604 and one of the first access node 606 and mobile entity 602. This process can happen independently of the L2 re-association process with the second access node 604. The request message 620 comprises identification, for example, the IP address of the first access node 606 to enable the second access node 504 to create the tunnel. The first access node 606 in response to the tunnel request message 622 from the second access node 604 sends a tunnel response message 624, which creates a unidirectional tunnel from the first access node 606 to the second access node 604. The data packets corresponding to the mobile entity 602 pending at the first access node 606 are transferred to the second access node 604 via the tunnel. Once the tunnel is successfully established between the first access node 606 and the second access node 604, and the pending data packets corresponding to the mobile entity 602 at the first access node 606 have been transferred to the second access node 604 the stored configuration data for the mobile entity 602 is conveyed in a response message 626. The configuration data comprises the already available second IP address along with a subnet mask and a default router address. The second access node 604 waits for the successful L2 association, prior to forwarding the response message 618 from a security perspective. If the L2 association fails for some reason, a negative response message 626 can be sent to the mobile entity 602 and the tunnel can be destroyed.

Once the mobile entity 602 has completed the handoff, the second access node can send a release message for IP addresses acquired during the initial attachment. In one embodiment, the process of releasing the IP address can be done using the DHCP release message. Each access node, for example the first access node 606, storing an IP address for a mobile entity's 602 MAC address can release the IP address corresponding to the mobile entity 602. The release message can be sent based on at least one condition. The condition comprises at least one of an elapsed time period, transfer of pending data from the first access node 606 to the second access node 604, mobile entity 602 detaching from the network domain, the mobile entity 602 handing off to a different access node and a forced release. The access nodes on receiving the release message allow a predetermined time before releasing the address. This is to prevent the condition where the target access node receives a new trigger message for the same mobile entity 602 from a different access node. The mobile entity has now completed the handoff from the first access node 606 to the second access node 604.

Figure 7:
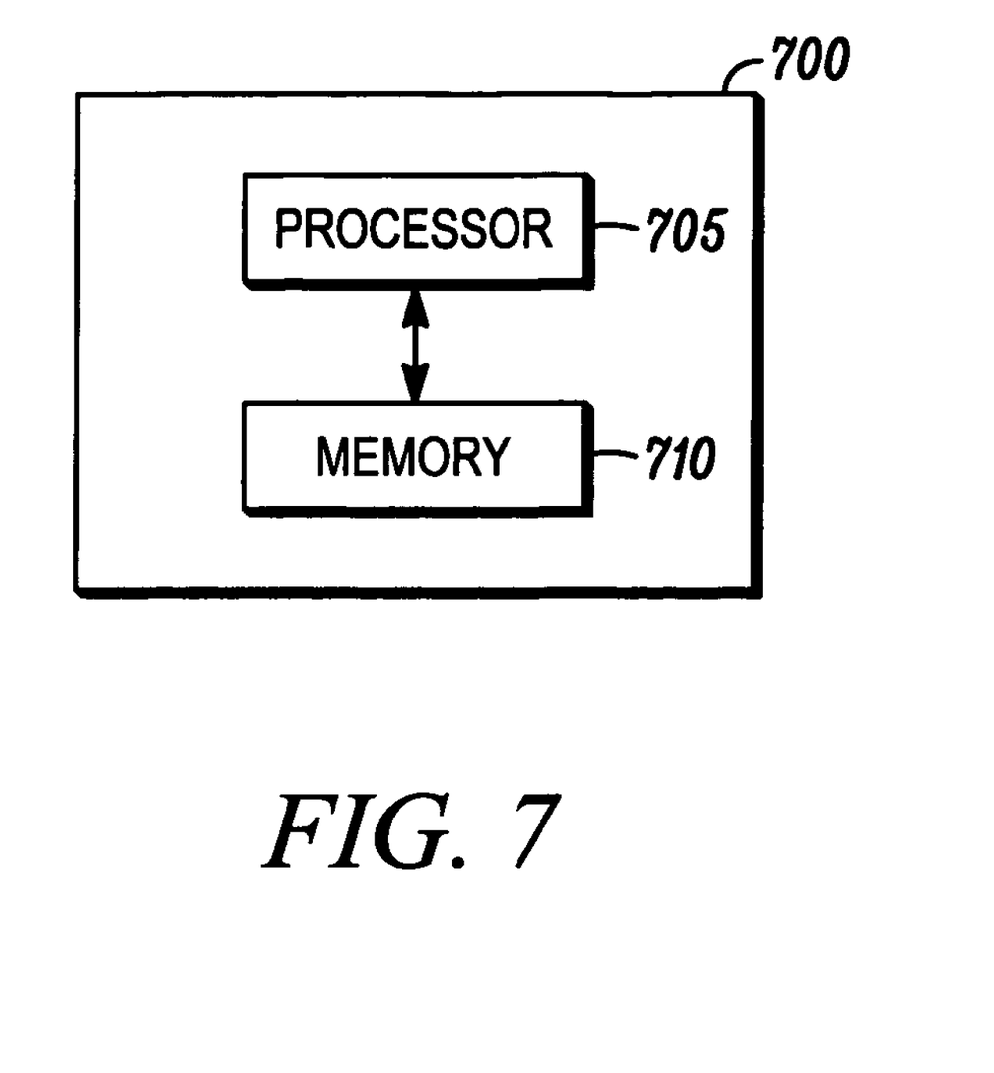
FIG. 7 is a block diagram illustrating an access node in a wireless communication network in accordance with an embodiment of the invention.

FIG. 7 illustrates an access node in a wireless communication network pursuant to an embodiment of the present invention. The first access node 700 comprises a processor 705 and a memory 710 operatively coupled to the processor 705. The processor 705 is adapted for obtaining a first Internet Protocol (IP) address for the mobile entity and identifying zero or more target access nodes for potential handover for the mobile entity. Once the first access node 705 identifies the zero or more target access nodes, the first access node sends a trigger message corresponding to the mobile entity to the identified zero or more target access nodes for acquiring a second IP address corresponding to the mobile entity at each of the zero or more target access nodes. The first access node 700 is further adapted to create a tunnel to a second access node and the mobile entity, the first access node 700 enabling the handoff of the mobile entity from the second access node.

In one embodiment, the first access node 700 maintains a neighbor map comprising subnet information corresponding to at least one access node in the wireless communication network, so that each access node can determine whether it needs to deal with network layer or link layer hardware. The first access node 700 is further adapted for sending the trigger message to at least one target access node for acquiring a second IP address corresponding to the mobile entity to facilitate a subsequent handoff to the target access node. In an embodiment of the invention the trigger message is one of a dynamic host configuration protocol (DHCP) message, a Fast Mobile Internet Protocol (FMIP) message, and an IEEE 802.11a/b/g message. The first access node 700 can be at least one of a base station and an access router. The first access node 700 and the target access nodes including the second access node form a part of the wireless communication network. The wireless communication network is an Internet protocol enabled broadcast capable multiple access shared medium wireless access network comprising IEEE 802.11 and 802.16 systems.

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

What is claimed is:

1. A method for facilitating handoff for a mobile entity in a wireless communication network, the method comprising:

obtaining a first internet protocol (IP) address for the mobile entity, the mobile entity being attached to a first access node;

identifying zero or more target access nodes, the zero or more access nodes being potential access nodes for handoff for the mobile entity;

sending a trigger message corresponding to the mobile entity to the identified zero or more access nodes; and acquiring a second IP address for the mobile entity at each of the zero or more target access nodes.

2. The method of claim 1, wherein the obtaining step further comprises:

receiving a request message for obtaining the first IP address;

sending a response message in response to the request message, the response message comprising configuration data, the configuration data further comprising at least one of an IP address corresponding to the mobile entity, a mobile entity identifier, a default router and a subnet mask.

3. The method of claim 2, wherein the request message and the response message are link-layer messages.

4. The method of claim 1, wherein the first access node differs from the zero or more target access nodes based on at least one characteristic.

5. The method of claim 4, wherein the characteristic comprises at least one of a subnet mask, a service load and a number of mobile entities attached.

6. The method of claim 1, wherein the trigger message is one of a dynamic host configuration protocol (DHCP) message, a Fast Mobile Internet Protocol (FMIP) message, and an IEEE 802.11a/b/g message.

7. The method of claim 1, wherein the first IP address is the same as the second IP address, if the subnet for the first access node is the same as the subnet for the second access node.

8. The method of claim 1, wherein the zero or more target access nodes are identified by the first access node using a neighbor map, the neighbor map is maintained at each access node and comprises subnet information corresponding to each access node in the wireless communication network.

9. A method for enabling handoff of a mobile entity in a wireless communication network, the method comprising:

receiving a request message corresponding to the mobile entity at a first access node;

acquiring a first IP address for the mobile entity corresponding to the first access node, if it was not already acquired;

creating a tunnel between the first access node and one of a second access node and the mobile entity, enabling the handoff of the mobile entity from the first access node; and sending a response message corresponding to the mobile entity;

sending a trigger message corresponding to the mobile entity to a third access node in response to the request message, and creating a tunnel between the third access node and at least one of a fourth access node, the second access node and the mobile entity in response to the trigger message.

10. The method of claim 9, further comprising: the first access node, assigning the first IP address to the mobile entity.

11. The method of claim 9, wherein the response message comprises configuration data, the configuration data further comprising at least one of a first IP address corresponding to the mobile entity, a mobile entity identifier, a default router and a subnet mask.

12. The method of claim 9, wherein the first access node sends a release message to zero or more access nodes in the wireless communication network based on at least one condition.

13. The method of claim 12, wherein the at least one condition comprises at least one of an elapsed time period, transfer of pending data from the second access node to the first access node, mobile entity detaching from a network domain, the mobile entity handing off to a different access node and a forced release.

14. The method of claim 13 is at least one of a base station and an access router.

15. The method of claim 13 wherein the wireless communication network is an Internet protocol enabled broadcast capable multiple access shared medium wireless access network comprising IEEE 802.11 and 802.16 systems.

16. The method of claim 12, wherein the zero or more access nodes release the IP address corresponding to the mobile entity in response to receiving the release message.

17. The method of claim 12, wherein the release message is sent to the zero or more access nodes only when the first access node had previously sent a trigger message to the zero or more access nodes.

18. A first access node in a wireless communication network, the first access node comprising:

a processor; and a memory operatively coupled to the processor and adapted for:

obtaining a first internet protocol (IP) address corresponding to a mobile entity;

identifying zero or more target access nodes, the zero or more access nodes being potential access nodes for handoff for the mobile entity;

sending a trigger message corresponding to the mobile entity to the identified zero or more access nodes; and acquiring a second IP address for the mobile entity at each of the zero or more target access nodes.

19. The first access node of claim 18, wherein the first access node is further adapted for creating a tunnel to at least one of a second access node and the mobile entity, the first access node enabling the handoff of the mobile entity from the second access node.

20. A method for enabling handoff of a mobile entity in a wireless communication network, the method comprising:

receiving a request message corresponding to the mobile entity at a first access node;

acquiring a first IP address for the mobile entity corresponding to the first access node, if it was not already acquired;

creating a tunnel between the first access node and one of a second access node and the mobile entity, enabling the handoff of the mobile entity from the first access node; and sending a response message corresponding to the mobile entity;

sending a trigger message to zero or more target access nodes, the zero or more access nodes being potential access nodes for handoff for the mobile entity;

acquiring a second IP address corresponding to the mobile entity at each of the zero or more target access nodes.

* * * * *